United States Patent
Krishan

(10) Patent No.: US 11,917,016 B2
(45) Date of Patent: Feb. 27, 2024

(54) METHODS, SYSTEMS, AND COMPUTER READABLE MEDIA FOR PROCESSING BINDING REQUESTS IN A TELECOMMUNICATIONS NETWORK

(71) Applicant: Oracle International Corporation, Redwood Shores, CA (US)

(72) Inventor: Rajiv Krishan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 37 days.

(21) Appl. No.: 17/696,570

(22) Filed: Mar. 16, 2022

(65) Prior Publication Data

US 2023/0300200 A1    Sep. 21, 2023

(51) Int. Cl.
*H04W 76/18*    (2018.01)
*H04W 76/25*    (2018.01)
*H04L 67/141*    (2022.01)

(52) U.S. Cl.
CPC ........... *H04L 67/141* (2013.01); *H04W 76/18* (2018.02); *H04W 76/25* (2018.02)

(58) Field of Classification Search
CPC ...... H04L 67/141; H04W 76/18; H04W 76/25
See application file for complete search history.

(56) References Cited

U.S. PATENT DOCUMENTS

| 2018/0192472 A1* | 7/2018 | Callard | H04L 49/9063 |
| 2019/0260834 A1* | 8/2019 | Thiebaut | H04L 67/14 |
| 2019/0357301 A1* | 11/2019 | Li | H04W 80/10 |
| 2019/0394745 A1* | 12/2019 | Yu | H04W 60/00 |
| 2021/0037375 A1* | 2/2021 | Cakulev | H04W 8/186 |
| 2022/0022101 A1* | 1/2022 | Wang | H04L 12/1425 |
| 2022/0060903 A1* | 2/2022 | Xin | H04W 12/108 |

(Continued)

OTHER PUBLICATIONS

"3rd Generation Partnership Project; Technical Specification Group Core Network and Terminals; 5G System; Session Management Policy Control Service; Stage 3 (Release 17)," 3GPP 29.512, V17.5.0, pp. 1-249 (Dec. 2021).

(Continued)

*Primary Examiner* — Ayaz R Sheikh
*Assistant Examiner* — Tarell A Hampton
(74) *Attorney, Agent, or Firm* — Jenkins, Taylor & Hunt, P.A.

(57) ABSTRACT

Methods, systems, and computer readable media for processing binding requests in a telecommunications network. A method includes receiving, at a binding support function (BSF), a first request to create a first binding between a protocol data unit (PDU) session and a first policy and control function (PCF). The method includes creating, at the BSF, the first binding between the PDU session and the first PCF and storing, with the first binding, a first PCF session acceptance timestamp from a first header of the first request. The method includes receiving, at the BSF, a second request to create a second binding between the PDU session and a second PCF. The method includes determining, at the BSF, whether to accept or reject the second request based on a difference between the first PCF session acceptance timestamp and a second PCF session acceptance timestamp from a second header of the second request.

20 Claims, 8 Drawing Sheets

(56) References Cited

U.S. PATENT DOCUMENTS

| | | | | |
|---|---|---|---|---|
| 2022/0070702 | A1* | 3/2022 | Puente Pestaña | H04W 8/186 |
| 2022/0201085 | A1* | 6/2022 | Hu | H04L 67/146 |
| 2023/0087243 | A1* | 3/2023 | Thiebaut | H04W 48/16 |
| 2023/0171639 | A1* | 6/2023 | Kim | H04W 48/18 370/229 |
| 2023/0189172 | A1* | 6/2023 | Qiao | H04W 36/0016 370/350 |

OTHER PUBLICATIONS

"3rd Generation Partnership Project; Technical Specification Group Core Network and Terminals; 5G System; Session Management Services; Stage 3 (Release 17)," 3GPP TS 29.502, V17.2.0, pp. 1-306 (Sep. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

"3rd Generation Partnership Project; Technical Specification Group Core Network and Terminals; 5G System; Network Slice Selection Services; Stage 3 (Release 16)," 3GPP TS 29.531, V16.3.0, pp. 1-61 (Jul. 2020).

* cited by examiner

METHODS, SYSTEMS, AND COMPUTER READABLE MEDIA FOR PROCESSING BINDING REQUESTS IN A TELECOMMUNICATIONS NETWORK

TECHNICAL FIELD

The subject matter described herein relates to telecommunications networks. More particularly, the subject matter described herein relates to methods, systems, and computer readable media for processing binding requests in a telecommunications network.

BACKGROUND

In fifth generation (5G) communications networks, the network node that provides service is referred to as a producer network function (NF). A network node that consumes services is referred to as a consumer NF. A network function can be both a producer NF and a consumer NF depending on whether it is consuming or providing service. An NF instance is an instance of a producer NF that provides a service. A given producer NF may include more than one NF instance.

Producer NFs register with a network function repository function (NRF). The NRF maintains service profiles of available NF instances identifying the services supported by each NF instance. Consumer NFs can subscribe to receive information about producer NF instances that have registered with the NRF.

A binding support function (BSF) allows a policy control function (PCF) to register, update, and remove binding information from it, and the BSF allows NF consumers to discover the selected PCF. The BSF stores the binding information for a certain PDU sessions and discovers the selected Policy Control Function according to the binding information. It also acts as diameter proxy agent or diameter redirect agent to Rx requests targeting an internet protocol (IP) address of user equipment (UE) to the selected PCF.

A binding at the BSF is preferably kept up-to-date, i.e., such that the binding references the PCF that is currently handling a corresponding active protocol data unit (PDU) session. Keeping the binding up-to-date ensures that application functions will be able to reach the right PCF instance that manages the corresponding PDU session.

In light of these and other difficulties, there exists a need for methods, systems, and computer readable media for processing binding requests in a telecommunications network.

SUMMARY

Methods, systems, and computer readable media for processing binding requests in a telecommunications network. A method includes receiving, at a binding support function (BSF), a first request to create a first binding between a protocol data unit (PDU) session and a first policy and control function (PCF). The method includes creating, at the BSF, the first binding between the PDU session and the first PCF and storing, with the first binding, a first PCF session acceptance timestamp from a first header of the first request. The method includes receiving, at the BSF, a second request to create a second binding between the PDU session and a second PCF. The method includes determining, at the BSF, whether to accept or reject the second request based on a difference between the first PCF session acceptance timestamp and a second PCF session acceptance timestamp from a second header of the second request.

According to another aspect of the subject matter described herein, determining whether to accept or reject the second request comprises determining that the second PCF session acceptance timestamp is later than the first PCF session acceptance timestamp and, in response, accepting the second request.

According to another aspect of the subject matter described herein, accepting the second request comprises deleting the first binding and creating the second binding between the PDU session and the second PCF.

According to another aspect of the subject matter described herein, determining whether to accept or reject the second request comprises determining that the second PCF session acceptance timestamp is earlier than the first PCF session acceptance timestamp and, in response, rejecting the second request.

According to another aspect of the subject matter described herein, the method includes receiving, at the first PCF, a session request from an access and mobility management function (AMF), session management function (SMF), or service communication proxy (SCP) and creating the PDU session.

According to another aspect of the subject matter described herein, the method includes sending, at the first PCF, the first request and adding the first PCF session acceptance timestamp to the first header of the first request.

According to another aspect of the subject matter described herein, sending the first request comprises sending the first request to the BSF by way of at least one SCP such that the SCP does not alter the first header of the first request.

According to another aspect of the subject matter described herein, the method includes sending, at the first PCF, a session acceptance message to the AMF, SMF, or SCP that sent the session request.

According to another aspect of the subject matter described herein, the session request includes one or more of: a 3gpp-Sbi-Origination-Timestamp, a 3gpp-Sbi-Sender-Timestamp, and a 3gpp-Sbi-Max-Rsp-Time header.

According to another aspect of the subject matter described herein, the AMF, SMF, or SCP that sent the session request times out and sends a different session request to the second PCF.

According to another aspect of the subject matter described herein, a system for processing binding requests in a telecommunications network includes at least one processor and memory storing instruction for the at least one processor. The system includes a BSF implemented by the at least one processor and configured for: receiving a first request to create a first binding between a protocol data unit (PDU) session and a first policy and control function (PCF); creating the first binding between the PDU session and the first PCF and storing, with the first binding, a first PCF session acceptance timestamp from a first header of the first request; receiving a second request to create a second binding between the PDU session and a second PCF; and determining whether to accept or reject the second request based on a difference between the first PCF session acceptance timestamp and a second PCF session acceptance timestamp from a second header of the second request.

According to another aspect of the subject matter described herein, determining whether to accept or reject the second request comprises determining that the second PCF session acceptance timestamp is later than the first PCF session acceptance timestamp and, in response, accepting the second request.

According to another aspect of the subject matter described herein, accepting the second request comprises deleting the first binding and creating the second binding between the PDU session and the second PCF.

According to another aspect of the subject matter described herein, determining whether to accept or reject the second request comprises determining that the second PCF session acceptance timestamp is earlier than the first PCF session acceptance timestamp and, in response, rejecting the second request.

According to another aspect of the subject matter described herein, the system includes the first PCF, and the first PCF is configured for receiving a session request from an access and mobility management function (AMF), session management function (SMF), or service communication proxy (SCP) and creating the PDU session.

According to another aspect of the subject matter described herein, the first PCF is configured for sending the first request and adding the first PCF session acceptance timestamp to the first header of the first request.

According to another aspect of the subject matter described herein, sending the first request comprises sending the first request to the BSF by way of at least one SCP such that the SCP does not alter the first header of the first request.

According to another aspect of the subject matter described herein, the first PCF is configured for sending a session acceptance message to the AMF, SMF, or SCP that sent the session request.

According to another aspect of the subject matter described herein, the session request includes one or more of: a 3gpp-Sbi-Origination-Timestamp, a 3gpp-Sbi-Sender-Timestamp, and a 3gpp-Sbi-Max-Rsp-Time header.

According to another aspect of the subject matter described herein, the AMF, SMF, or SCP that sent the session request times out and sends a different session request to the second PCF.

According to another aspect of the subject matter described herein, one or more non-transitory computer readable media have stored thereon executable instructions that when executed by at least one processor of a computer cause the computer to perform steps comprising receiving, at a binding support function (BSF), a first request to create a first binding between a protocol data unit (PDU) session and a first policy and control function (PCF); creating, at the BSF, the first binding between the PDU session and the first PCF and storing, with the first binding, a first PCF session acceptance timestamp from a first header of the first request; receiving, at the BSF, a second request to create a second binding between the PDU session and a second PCF; and determining, at the BSF, whether to accept or reject the second request based on a difference between the first PCF session acceptance timestamp and a second PCF session acceptance timestamp from a second header of the second request.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps.

Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for processing binding requests in a telecommunications network.

A binding support function (BSF) allows a policy control function (PCF) to register, update, and remove binding information from it, and the BSF allows NF consumers to discover the selected PCF. The BSF stores the binding information for certain PDU sessions and discovers the selected PCF according to the binding information. It also acts as diameter proxy agent or diameter redirect agent to Rx requests targeting an internet protocol (IP) address of user equipment (UE) to the selected PCF.

For any application function (AF) using Rx, such as P-CSCF, the BSF determines the selected PCF address according to the information carried by the incoming Rx requests. The BSF provides a PDU session binding functionality, which ensures that an AF request for a certain PDU Session reaches the relevant PCF holding the PDU session information. This service:

Allows PCF users to register, update, and remove the binding information

Allows NF consumers to retrieve the binding information

A binding at the BSF is preferably kept up-to-date, i.e., such that the binding references the PCF that is currently handling a corresponding active PDU session. Keeping the binding up-to-date ensures that application functions will be able to reach the right PCF instance that manages the corresponding PDU session. The binding may, however, become out-of-date, for example, when a requesting node times out and re-tries a PDU session request, creating a race condition between an initial request and a re-tried request.

This document describes a solution to this issue where the PCF, when accepting a PDU session request, adds a PCF session acceptance timestamp to a custom header of a binding request message to a BSF. The BSF can compare the PCF session acceptance timestamp stored with an existing binding to a PCF session acceptance timestamp of a new request to determine whether the new request is out-of-date and therefore whether to accept or reject the new request. Since the PCF session acceptance timestamp is added to a custom header, other network nodes will not alter the PCF session acceptance timestamp in transit between the PCF and the BSF.

The solution can provide one or more of the following features:
- A custom header enables PCF and BSF to track the latest binding requests. Thus it does not overstep on existing headers.
- The solution is backward compatible, i.e., if PCF does not add this custom header, then BSF will run its default logic. If PCF adds this custom header that BSF does not understand, then BSF will simply ignore it.
- Being a custom header, it will not be manipulated by intermediate nodes like SCP.
- The solution works even when AMF/SMF/SCP does not add 3gpp-Sbi-Origination-Timestamp or 3gpp-Sbi-Sender-Timestamp header.

Figure 1:
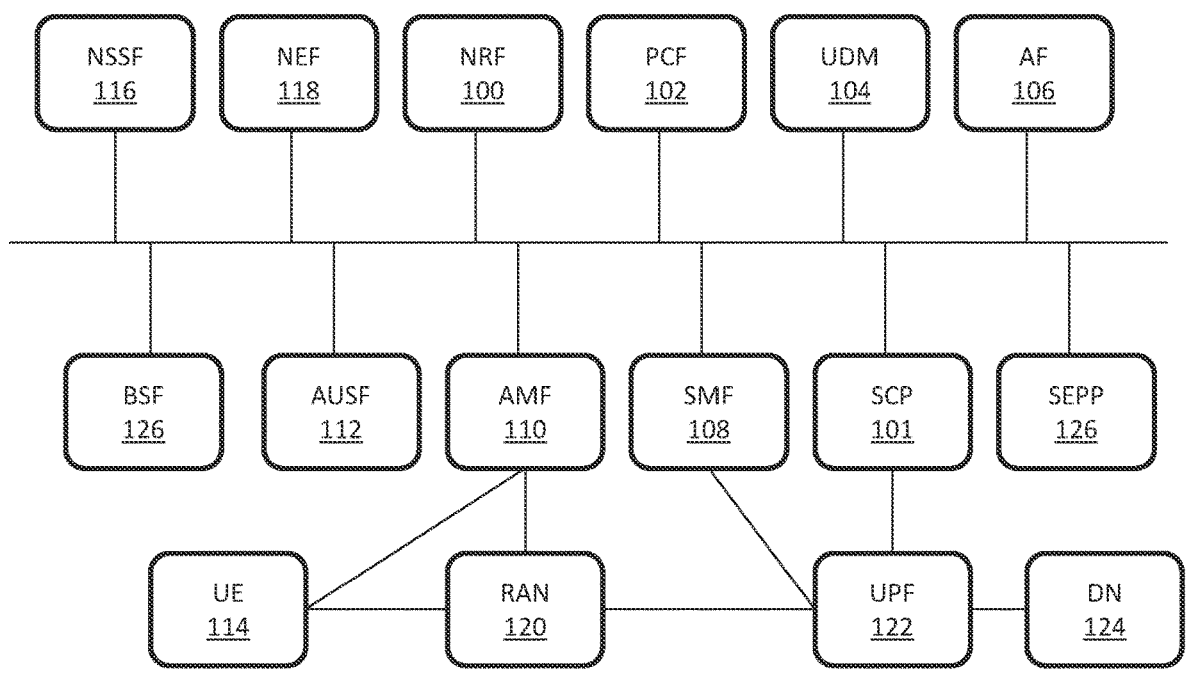
FIG. 1 is a block diagram illustrating an example 5G system network architecture.

FIG. 1 is a block diagram illustrating an example 5G system network architecture. The architecture in FIG. 1 includes network function repository function (NRF) 100 and service communication proxy (SCP) 101, which may be located in the same home public land mobile network (HPLMN). NRF 100 may maintain profiles of available producer NF service instances and their supported services and allow consumer NFs or SCPs to subscribe to and be notified of the registration of new/updated producer NF service instances.

SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP can obtain the NF or service profile or the producer NF instance from NRF 100. The NF or service profile can be a JavaScript object notation (JSON) data structure as defined in the 3$^{rd}$ Generation Partnership Project (3GPP) Technical Specification (TS) 29.510.

In FIG. 1, network nodes can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services.

The nodes illustrated in FIG. 1 further include a session management function (SMF) 108 that manages sessions between access and mobility management function (AMF) 110 and PCF 102. An authentication server function (AUSF) 112 performs authentication services for user equipment (UEs), such as user equipment (UE) 114, seeking access to the network.

AMF 110 performs mobility management operations similar to those performed by a mobility management entity (MME) in 4G networks. AMF 110 can perform, e.g., registration management, reachability management, connection management, and mobility management.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality.

UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a visitor PLMN which manages security for the visitor PLMN. Thus, traffic between NFs in different PLMNs may traverse two SEPP functions, one for the home PLMN and the other for the visitor PLMN.

A network slice selection function (NSSF) 116 provides network slicing services for devices seeking to access specific network capabilities and characteristics associated with a network slice. Network slices enable users to select customized networks with different functionality (e.g., mobility) and/or performance requirements (e.g., latency, availability, reliability).

BSF 126 allows PCF 102 to register, update, and remove binding information from it, and BSF 126 allows NF consumers to discover the selected PCF. BSF 126 stores the binding information for certain PDU sessions and discovers the selected PCF according to the binding information.

The bindings at BSF 126 should be up-to-date with reference to PCFs that have corresponding active PDU sessions. Up-to-date bindings can be useful to ensure that application functions will be able to reach the correct PCF instance that manages a corresponding PDU session. Otherwise, a stale binding may lead to failure of Rx/PA flows between AF 106 and PCF 102. For example, during binding discovery at BSF 126, if BSF 126 provides PCF identities of NFs that have stale PDU sessions, then AF 106 may try to reach a stale PCF that cannot provide end-end flow on Rx/PA.

To prevent out-of-date binding information at BSF 126, PCF 102 is configured for adding a PCF acceptance timestamp to a custom header of binding request messages sent to BSF 126. The PCF acceptance timestamp can indicate, for example, a time that PCF 102 created a PDU session or any appropriate time related to the creation of the PDU session (e.g., time session created request is validated and accepted by PCF for processing). BSF 126 can compare the PCF session acceptance timestamp stored with an existing binding to a PCF session acceptance timestamp of a new request to determine whether the new request is out-of-date and therefore whether to accept or reject the new request. Since the PCF session acceptance timestamp is added to a custom header, other network nodes will not alter the PCF session acceptance timestamp in transit between PCF 102 and BSF 126.

The 3GPP technical specifications define some existing timer headers. These timer headers may be modified during transit, for example, by SCP 101. For example, 3GPP 29.502 provides:

3gpp-Sbi-Origination-Timestamp: The header contains the date and time (with a millisecond granularity) when the originating entity initiated the request.

An AMF originating a Create SM Context request shall include in the message the Origination Time Stamp indicating the absolute time at which the request is initiated.

An HTTP request may include the 3gpp-Sbi-Origination-Timestamp and the 3gpp-Sbi-Max-Rsp-Time headers, with or without the 3gpp-Sbi-Sender-Timestamp header.

The 3gpp-Sbi-Max-Rsp-Time header shall indicate the duration expressed in milliseconds since the absolute time indicated in the 3gpp-Sbi-Sender-Timestamp header, if this header is present, or indicated in the 3gpp-Sbi-Origination-Timestamp header otherwise.

3GPP TS 29.512 provides:

If the SMF receives a request to create an SM Context or a PDU session context, which includes the 3gpp-Sbi-Origination-Timestamp header as defined in subclause 5.2.3.2, the SMF shall forward this header to the PCF as HTTP custom header.

Upon receipt of a Npcf_SMPolicyControl_Create service request which collides with an existing SM Policy Association for the same UE (i.e. same values of "supi" attribute) and the same PDU session Id (i.e. same values of "pduSessionId" attribute), the PCF shall accept the new request only if it contains a more recent timestamp within the 3gpp-Sbi-Origination-Timestamp header than the origination timestamp stored for the existing SM Policy Association. An incoming Npcf_SMPolicyControl_Create service request shall be considered as more recent than an existing SM Policy Association and be accepted if no 3gpp-Sbi-Origination-Timestamp header was provided for at least one of the two SM Policy Associations. The PCF shall reject an incoming request whose timestamp is less recent than the timestamp of the existing SM Policy Association with the HTTP status code "403 Forbidden" and the application error "LATE OVERLAPPING REQUEST".

Figure 2:
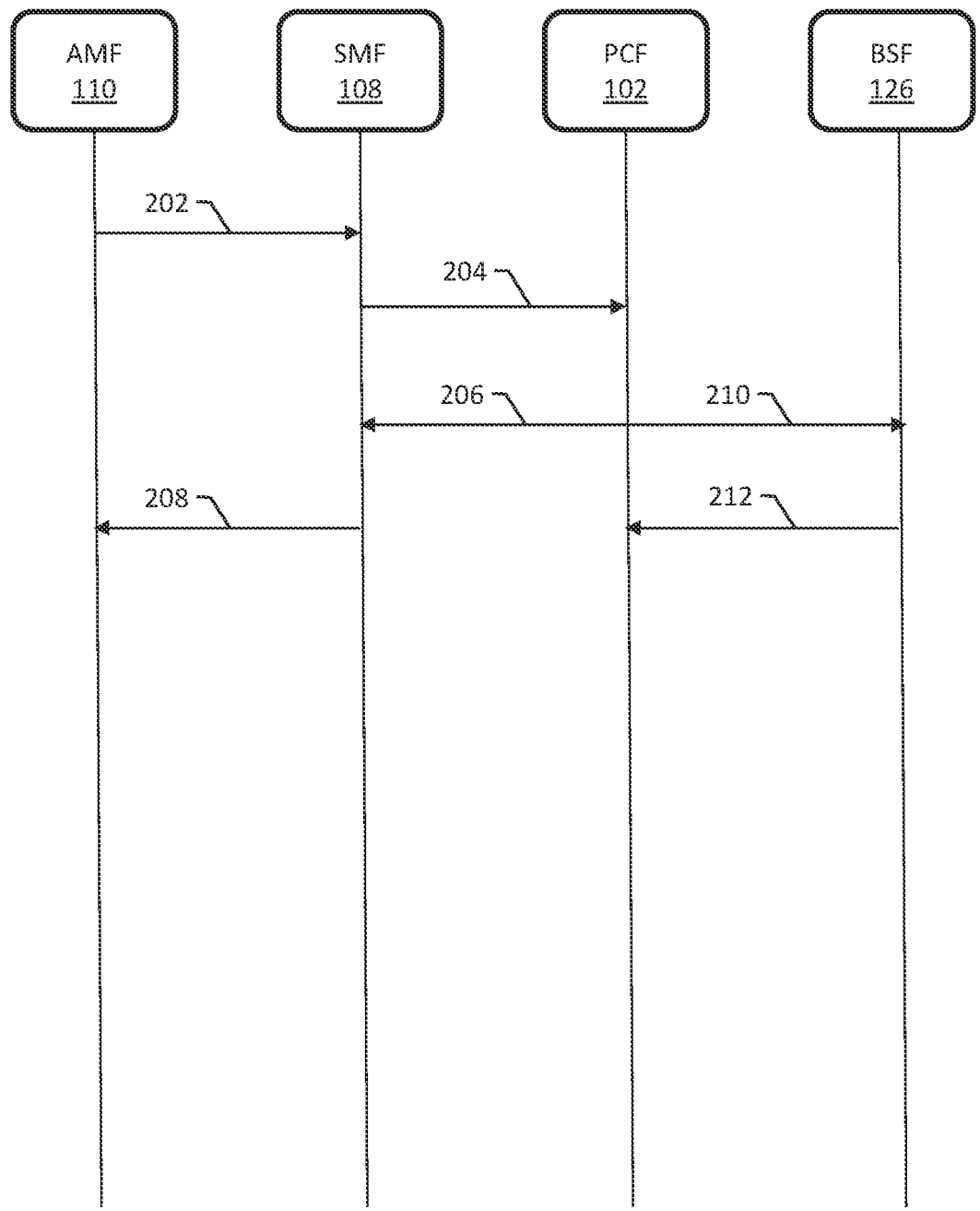
FIG. 2 is a ladder diagram illustrating asynchronous handling of a binding creation at BSF.

FIG. 2 is a ladder diagram illustrating asynchronous handling of a binding creation at BSF 126. FIG. 2 shows AMF 110, SMF 108, PCF 102, and BSF 126; however, other nodes may be present. For example, there may be SCPs in-between network functions that are not shown.

AMF 110 sends a Create sm-contexts Request message 202 to SMF 108. SMF 108 sends a Create session Request message 204 to PCF 102. PCF 102 processes the request and then sends a Create session Response Message 206 to SMF 108. SMF 108, in response, sends a Create sm-contexts Response message 208 to AMF 110.

After PCF 102 processes the request, PCF 102 also sends a Create binding Request message 210 to BSF 126. BSF 126 processes the request by creating the binding and then sends a Create binding Response message 212 to PCF 102. PCF 102 can send messages 206 and 210 in parallel or in any order after processing the request.

Figure 3:
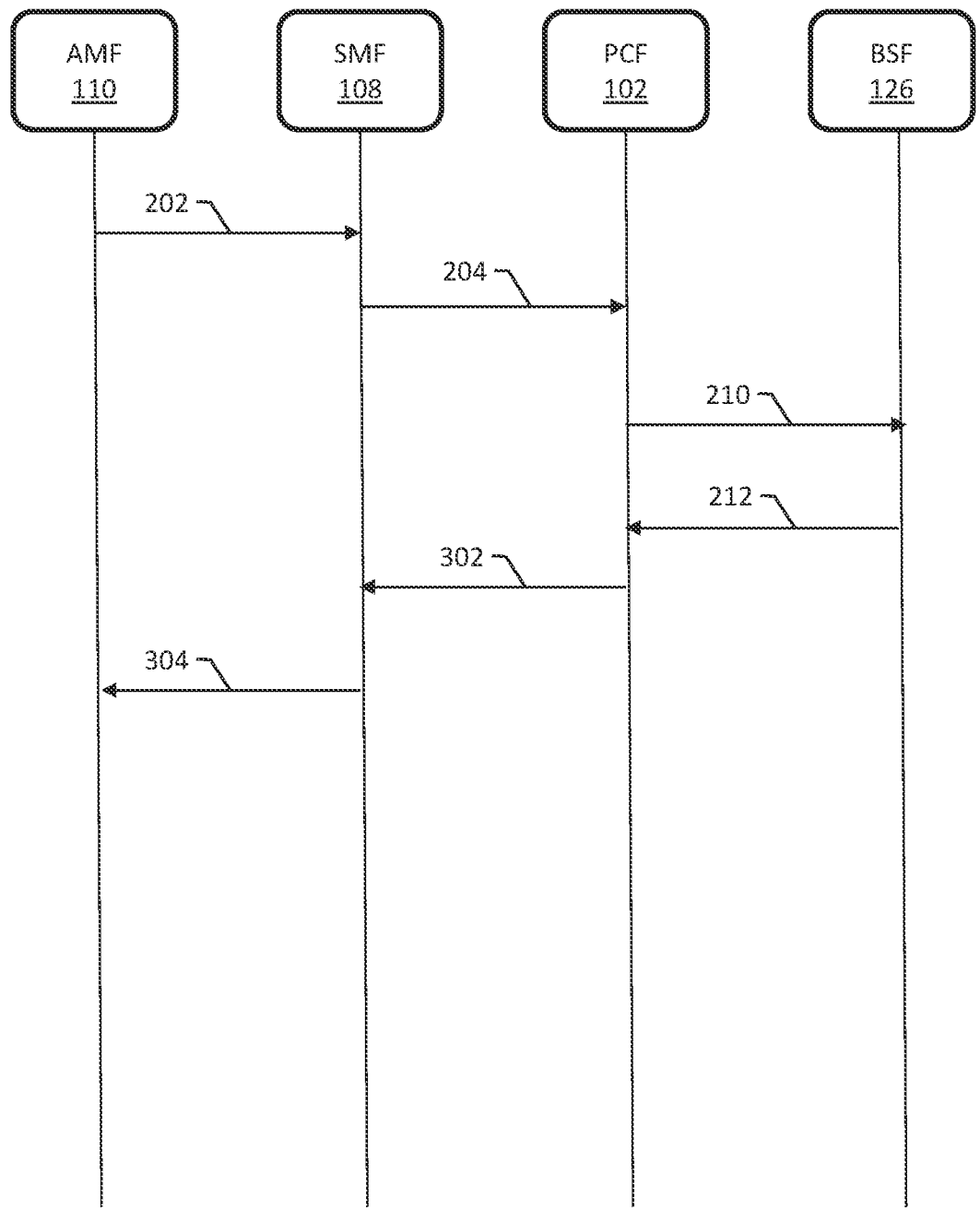
FIG. 3 is a ladder diagram illustrating synchronous handling of a binding creation at BSF.

FIG. 3 is a ladder diagram illustrating synchronous handling of a binding creation at BSF 126. FIG. 3 shows AMF 110, SMF 108, PCF 102, and BSF 126; however, other nodes may be present. For example, there may be SCPs in-between network functions that are not shown.

AMF 110 sends a Create sm-contexts Request message 202 to SMF 108. SMF 108 sends a Create session Request message 204 to PCF 102. PCF 102 processes the request and then sends a Create binding Request message 210 to BSF 126. BSF 126 processes the request by creating the binding and then sends a Create binding Response message 212 to PCF 102.

PCF 102 waits until receiving the Create binding Response message 212 and then sends a Create session Response Message 302 to SMF 108. SMF 108, in response, sends a Create sm-contexts Response message 304 to AMF 110.

Figure 4:
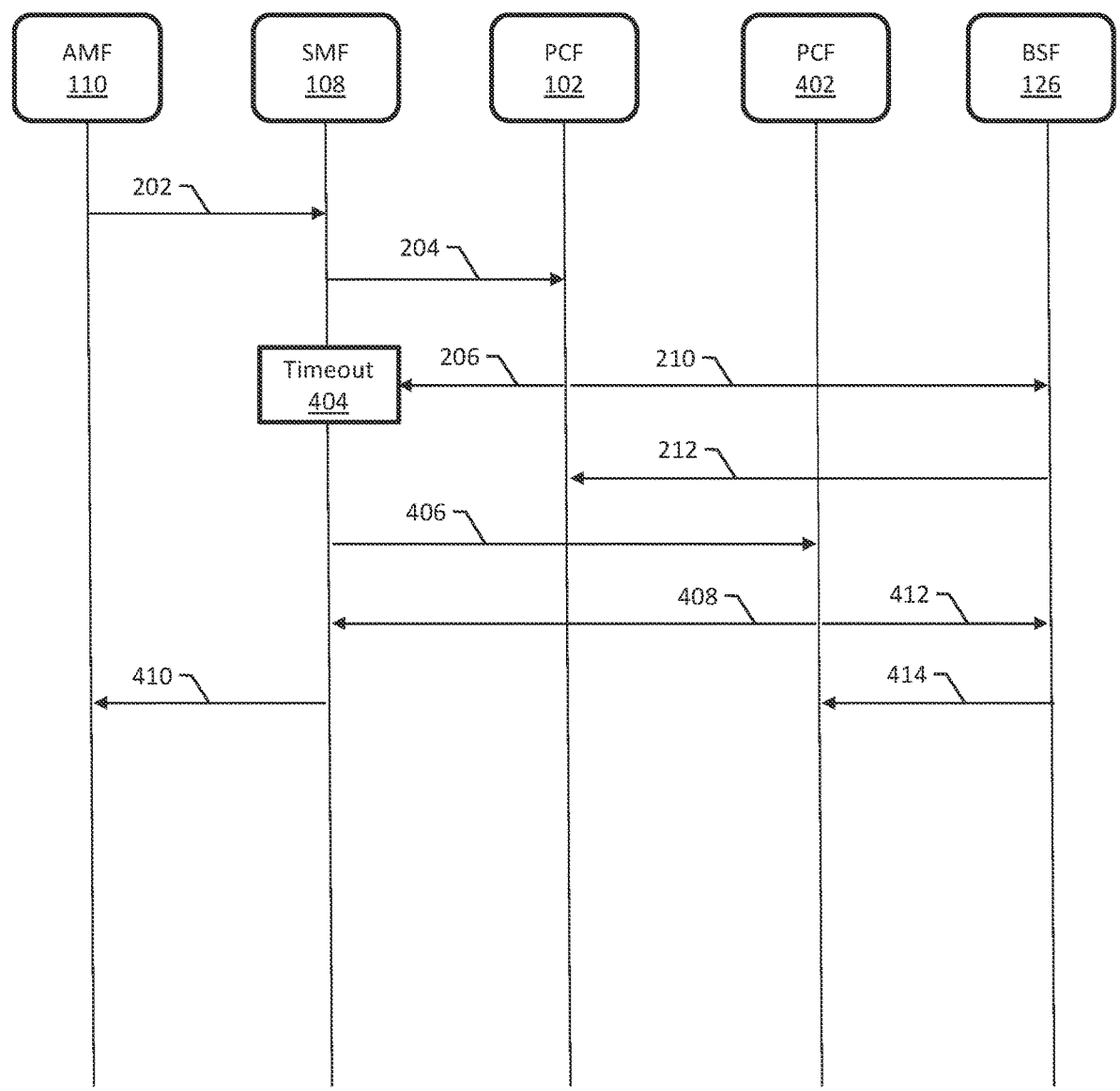
FIG. 4 is a ladder diagram illustrating an asynchronous scenario potentially leading to an out-of-date binding at BSF.

FIG. 4 is a ladder diagram illustrating an asynchronous scenario potentially leading to an out-of-date binding at BSF 126. FIG. 4 shows AMF 110, SMF 108, PCF 102, and BSF 126; however, other nodes may be present. For example, there may be SCPs in-between network functions that are not shown, or an SCP may take the place of SMF 108. FIG. 4 also shows a second PCF 402.

AMF 110 sends a Create sm-contexts Request message 202 to SMF 108. SMF 108 sends a Create session Request message 204 to PCF 102. PCF 102 processes the request and then sends a Create session Response Message 206 to SMF 108.

After PCF 102 processes the request, PCF 102 also sends a Create binding Request message 210 to BSF 126. BSF 126 processes the request by creating the binding and then sends a Create binding Response message 212 to PCF 102. PCF 102 can send messages 206 and 210 in parallel or in any order after processing the request.

SMF 108, however, times out 404 waiting for a response from PCF 102 and decides to re-try its request to PCF 402. SMF 108 rejects the response message 206 from PCF 102. SMF 108 sends a Create session Request message 406 to PCF 402. PCF 402 processes the request and sends a Create session Response message 408 to SMF 108. SMF 108, in response, sends a Create sm-contexts Response message 410 to AMF 110.

After PCF 402 processes the request, PCF 402 also sends a Create binding Request message 412 to BSF 126. BSF 126 processes the request by creating the binding and then sends a Create binding Response message 414 to PCF 402. PCF 402 can send messages 408 and 412 in parallel or in any order after processing the request.

Messages 210 and 412 can reach BSF 126 in any order, for example, due to network delay or due to an SCP between one of the PCFs and BSF 126. If BSF 126 uses the request 210 from PCF 102 to override a binding from PCF 402, then BSF 126 will have a stale record. Even if PCF 102 detects later that it has a stale session and cleans up its binding at BSF 126, that will result in BSF 126 not having any binding at all.

Although a timeout is shown for SMF 108, AMF 110 could also time out. AMF 110 then could re-try its session request towards an alternate SMF and PCF, potentially resulting in a stale or absent binding at BSF 126.

Figure 5:
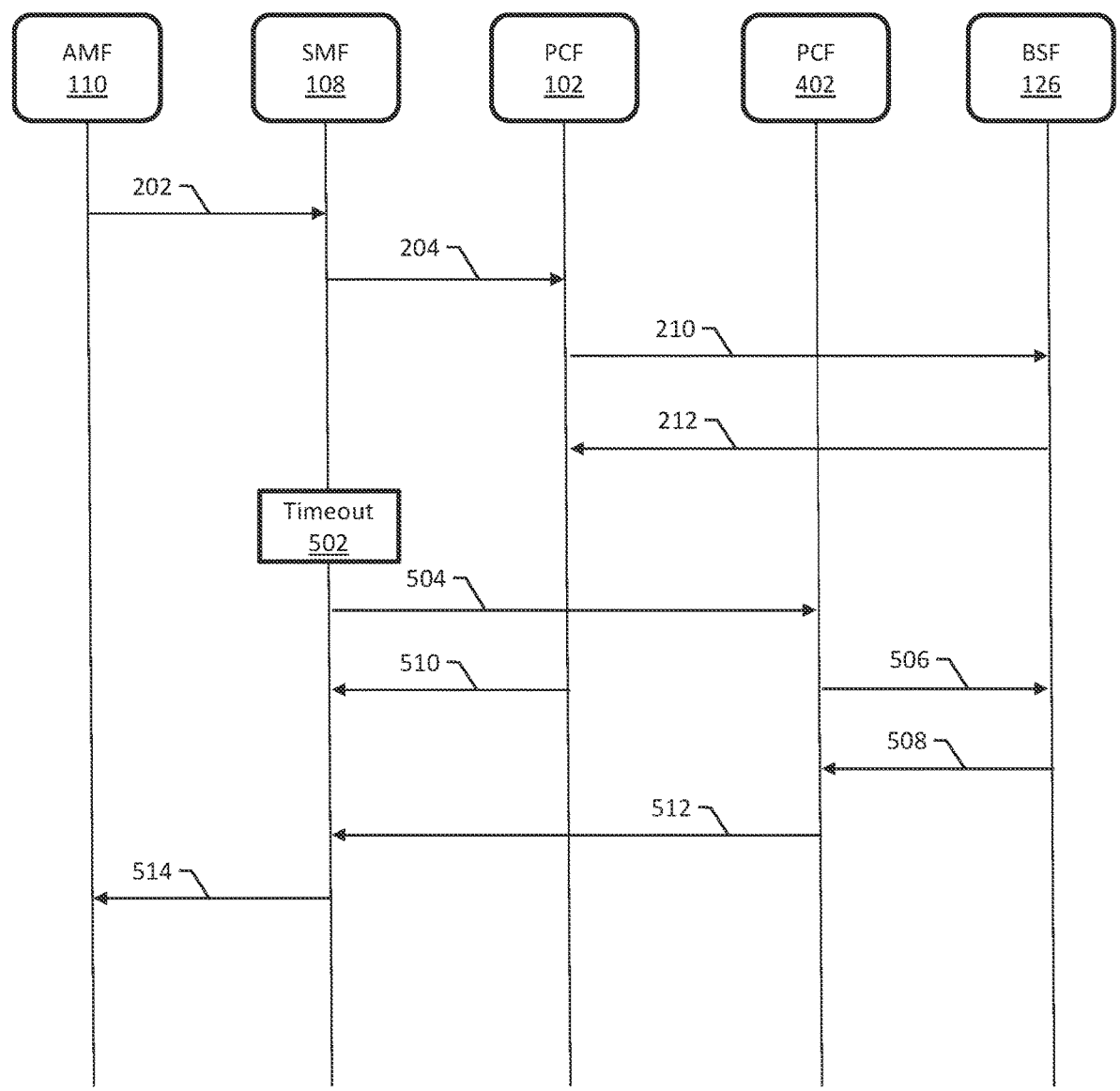
FIG. 5 is a ladder diagram illustrating a synchronous scenario potentially leading to an out-of-date binding at BSF.

FIG. 5 is a ladder diagram illustrating a synchronous scenario potentially leading to an out-of-date binding at BSF 126. FIG. 5 shows AMF 110, SMF 108, PCF 102, PCF 402, and BSF 126; however, other nodes may be present. For example, there may be SCPs in-between network functions that are not shown, or an SCP may take the place of SMF 108.

AMF 110 sends a Create sm-contexts Request message 202 to SMF 108. SMF 108 sends a Create session Request message 204 to PCF 102. PCF 102 processes the request and then sends a Create binding Request message 210 to BSF 126. BSF 126 processes the request by creating the binding and then sends a Create binding Response message 212 to PCF 102.

SMF 108, however, times out 502 waiting for a response from PCF 102 and decides to re-try its request to PCF 402. SMF 108 sends a Create session Request message 504 to PCF 402. PCF 402 processes the request and sends a Create binding Request message 506 to BSF 508. BSF 126 processes the request by creating the binding and then sends a Create binding Response message 508 to PCF 402.

SMF 108 rejects the Create session Response message 510 from PCF 102. After PCF 402 processes the request, PCF 402 sends a Create session Response message 512 to SMF 108. SMF 108, in response, sends a Create sm-contexts Response message 514 to AMF 110.

Messages 210 and 506 can reach BSF 126 in any order, for example, due to network delay or due to an SCP between one of the PCFs and BSF 126. If BSF 126 uses the request 210 from PCF 102 to override a binding from PCF 402, then BSF 126 will have a stale record. Even if PCF 102 detects later that it has a stale session and cleans up its binding at BSF 126, that will result in BSF 126 not having any binding at all.

Although a timeout is shown for SMF 108, AMF 110 could also time out. AMF 110 then could re-try its session request towards an alternate SMF and PCF, potentially resulting in a stale or absent binding at BSF 126.

The 3gpp-Sbi-Origination-Timestamp and 3gpp-Sbi-Sender-Timestamp headers may not be sufficient for resolving stale binding requests as described with reference to FIGS. 5-6. 3GPP TS 29.502 captures discussion about 3gpp-Sbi-Origination-Timestamp header between AMF and SMF. It is not a defined header for PCF to generate. Also when this header is provided by AMF (and forwarded by SMF), PCF shall forward it to BSF as well to ensure end-to-end tracking of session for which binding is being created. However, inclusion of this header cannot help BSF detect the PCF that has the active session context.

3GPP TS 29.500 captures that SCP is allowed to manipulate 3gpp-Sbi-Sender-Timestamp header. Thus if a first PCF added this header, SCP may refresh it to a latest value. Therefore, when BSF receives delayed request from the first PCF with updated 3gpp-Sbi-Sender-Timestamp header, it will consider it as the latest for message processing. Therefore, the 3gpp-Sbi-Origination-Timestamp and 3gpp-Sbi-Sender-Timestamp headers cannot be used between PCF and BSF to detect the latest PCF with active session context.

This document describes a solution where the PCF can add a custom header, e.g., "vendor-pcf-session-timestamp" with its session acceptance timestamp. i.e., a timestamp indicating when the PCF has accepted the SMF session create request. For example:

When 3gpp-Sbi-Origination-Timestamp and/or 3gpp-Sbi-Sender-Timestamp header 3gpp-Sbi-Max-Rsp-Time header is present, then it's the timestamp when PCF validated the request for being stale and accepted it for further processing.

When 3gpp-Sbi-Origination-Timestamp and 3gpp-Sbi-Sender-Timestamp is not present, then it's the timestamp when PCF received the request from SMF/SCP.

Being a custom header, the SCP will proxy the header as-is to the BSF. The BSF maintains the value from the custom header in its context data with the binding context. On receipt of a second binding create request for the same binding context, the BSF can do the following:

If incoming "vendor-pcf-session-timestamp" header has older value (i.e. it means late arrival) than already stored in context data, then reject the incoming request.

If incoming "vendor-pcf-session-timestamp" header has latest value (i.e. it means fresh record) than already stored in context data, then accept the incoming request and override the stored binding record.

Figure 6:
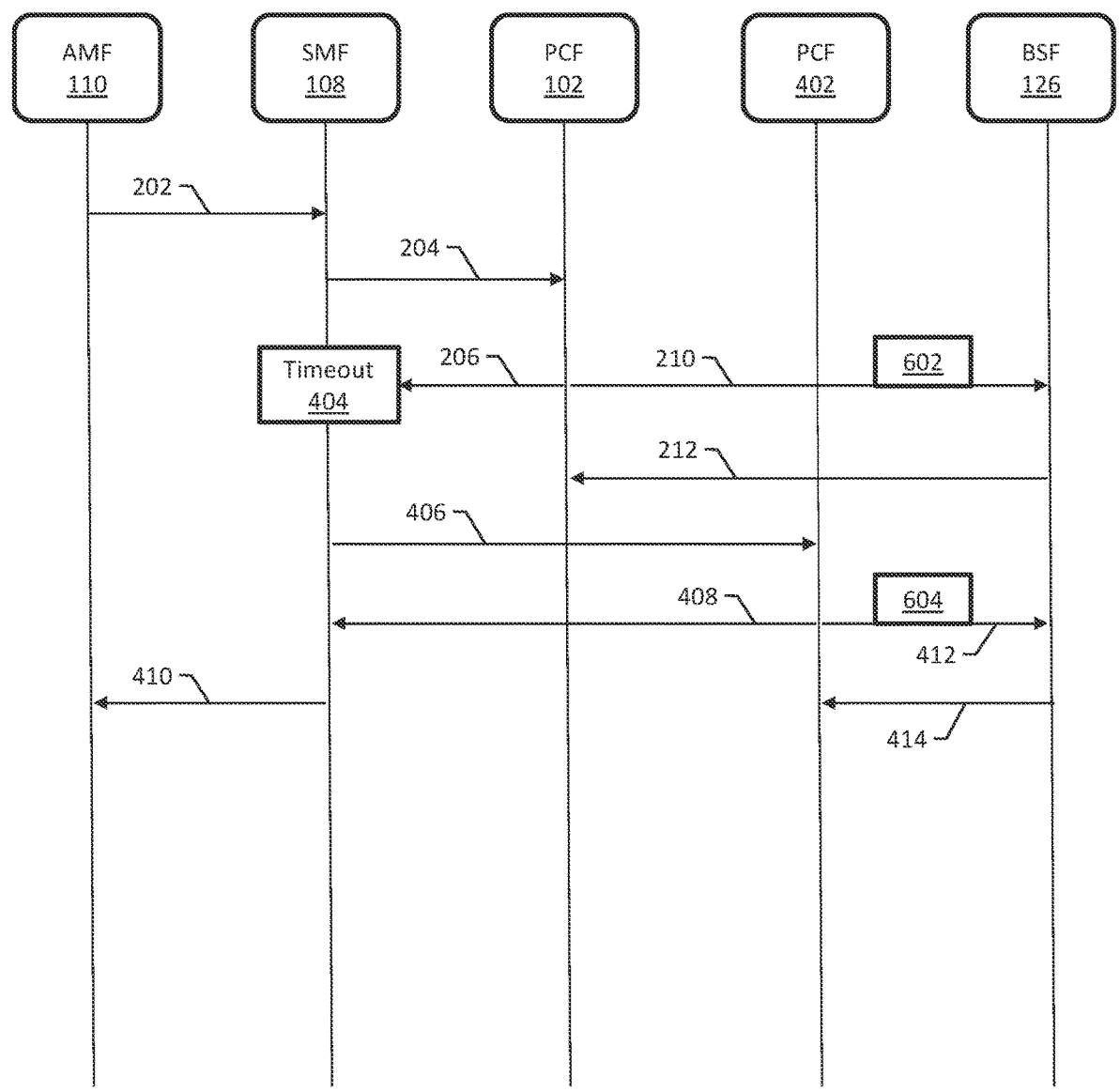
FIG. 6 is a ladder diagram illustrating an asynchronous scenario and a solution to avoid a stale binding.

FIG. 6 is a ladder diagram illustrating an asynchronous scenario and a solution to avoid a stale binding. FIG. 6 shows AMF 110, SMF 108, PCF 102, PCF 402 and BSF 126; however, other nodes may be present. For example, there may be SCPs in-between network functions that are not shown, or an SCP may take the place of SMF 108.

AMF 110 sends a Create sm-contexts Request message 202 to SMF 108. SMF 108 sends a Create session Request message 204 to PCF 102. PCF 102 processes the request and then sends a Create session Response Message 206 to SMF 108.

After PCF 102 processes the request, PCF 102 also sends a Create binding Request message 210 to BSF 126. PCF 102 includes a PCF session acceptance timestamp 602 in a header of the message 210. BSF 126 processes the request by creating the binding and storing the PCF session acceptance timestamp. BSF 126 then sends a Create binding Response message 212 to PCF 102. PCF 102 can send messages 206 and 210 in parallel or in any order after processing the request.

SMF 108, however, times out 404 waiting for a response from PCF 102 and decides to re-try its request to PCF 402. SMF 108 rejects the message 206 from PCF 102. SMF 108 sends a Create session Request message 406 to PCF 402. PCF 402 processes the request and sends a Create session Response message 408 to SMF 108. SMF 108, in response, sends a Create sm-contexts Response message 410 to AMF 110.

After PCF 402 processes the request, PCF 402 also sends a Create binding Request message 412 to BSF 126. PCF 402 includes a PCF session acceptance timestamp 604 in a header of the message 408.

BSF 126 determines that both messages 210 and 412 are requesting a binding for the same PDU session. For example, BSF 126 can check identifiers in both messages (e.g., subscriber identifiers, dnn, ipaddress etc) to determine that both messages 210 and 412 are requesting a binding for the same PDU session. BSF 126 compares the PCF session acceptance timestamps 602 and 604 and retains the binding that has the latest indicated acceptance time (e.g., highest value).

If BSF 126 determines to accept request message 412 from PCF 402, then BSF 126 processes the request by creating the binding and then sends a Create binding Response message 414 to PCF 402. PCF 402 can send messages 408 and 412 in parallel or in any order after processing the request.

Although a timeout is shown for SMF 108, AMF 110 could also time out. AMF 110 then could re-try its session request towards an alternate SMF and PCF, potentially resulting in a stale or absent binding at BSF 126.

Figure 7:
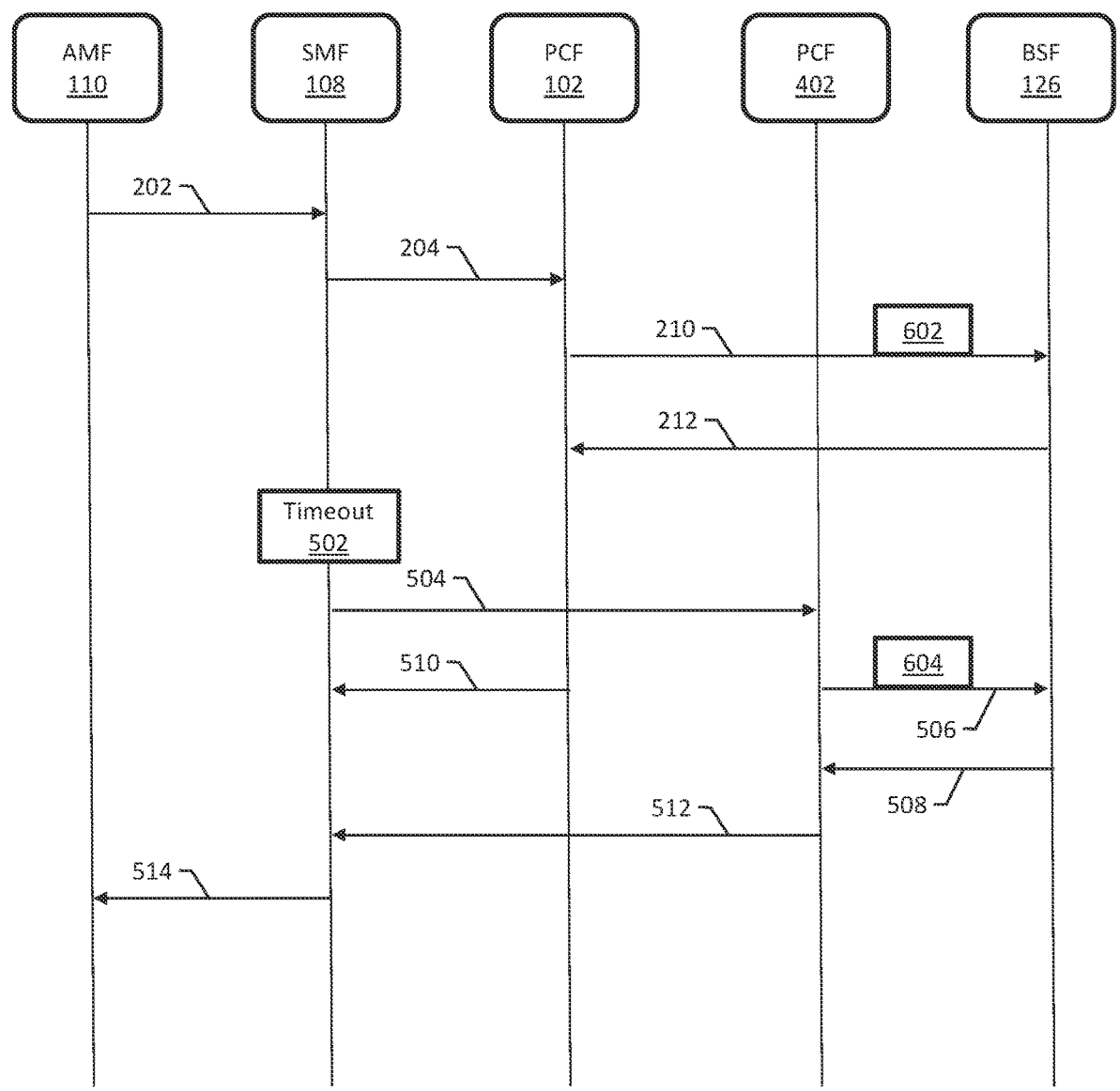
FIG. 7 is a ladder diagram illustrating a synchronous scenario and a solution to avoid a stale binding.

FIG. 7 is a ladder diagram illustrating a synchronous scenario and a solution to avoid a stale binding. FIG. 5 shows AMF 110, SMF 108, PCF 102, PCF 402, and BSF 126; however, other nodes may be present. For example, there may be SCPs in-between network functions that are not shown, or an SCP may take the place of SMF 108.

AMF 110 sends a Create sm-contexts Request message 202 to SMF 108. SMF 108 sends a Create session Request message 204 to PCF 102. PCF 102 processes the request and then sends a Create binding Request message 210 to BSF 126. PCF 102 includes a PCF session acceptance timestamp 602 in a header of the message 210. BSF 126 processes the request by creating the binding and storing the PCF session acceptance timestamp 602. BSF 126 then sends a Create binding Response message 212 to PCF 102.

SMF 108, however, times out 502 waiting for a response from PCF 102 and decides to re-try its request to PCF 402. SMF 108 sends a Create session Request message 504 to PCF 402. PCF 402 processes the request and sends a Create binding Request message 506 to BSF 508. PCF 402 includes a PCF session acceptance timestamp 604 in a header of the message 506.

BSF 126 determines that both messages 210 and 506 are requesting a binding for the same PDU session. For example, BSF 126 can check identifiers in both messages (e.g., subscriber identifiers) to determine that both messages 210 and 506 are requesting a binding for the same PDU session. BSF 126 compares the PCF session acceptance timestamps 602 and 604 and retains the binding that has the latest indicated acceptance time (e.g., highest value).

If BSF 126 determines to accept request message 506 from PCF 402, BSF 126 processes the request by creating the binding and then sends a Create binding Response message 508 to PCF 402.

SMF 108 rejects the Create session Response message 510 from PCF 102. After PCF 402 processes the request, PCF 402 sends a Create session Response message 512 to SMF 108. SMF 108, in response, sends a Create sm-contexts Response message 514 to AMF 110.

Although a timeout is shown for SMF 108, AMF 110 could also time out. AMF 110 then could re-try its session request towards an alternate SMF and PCF, potentially resulting in a stale or absent binding at BSF 126.

Figure 8:
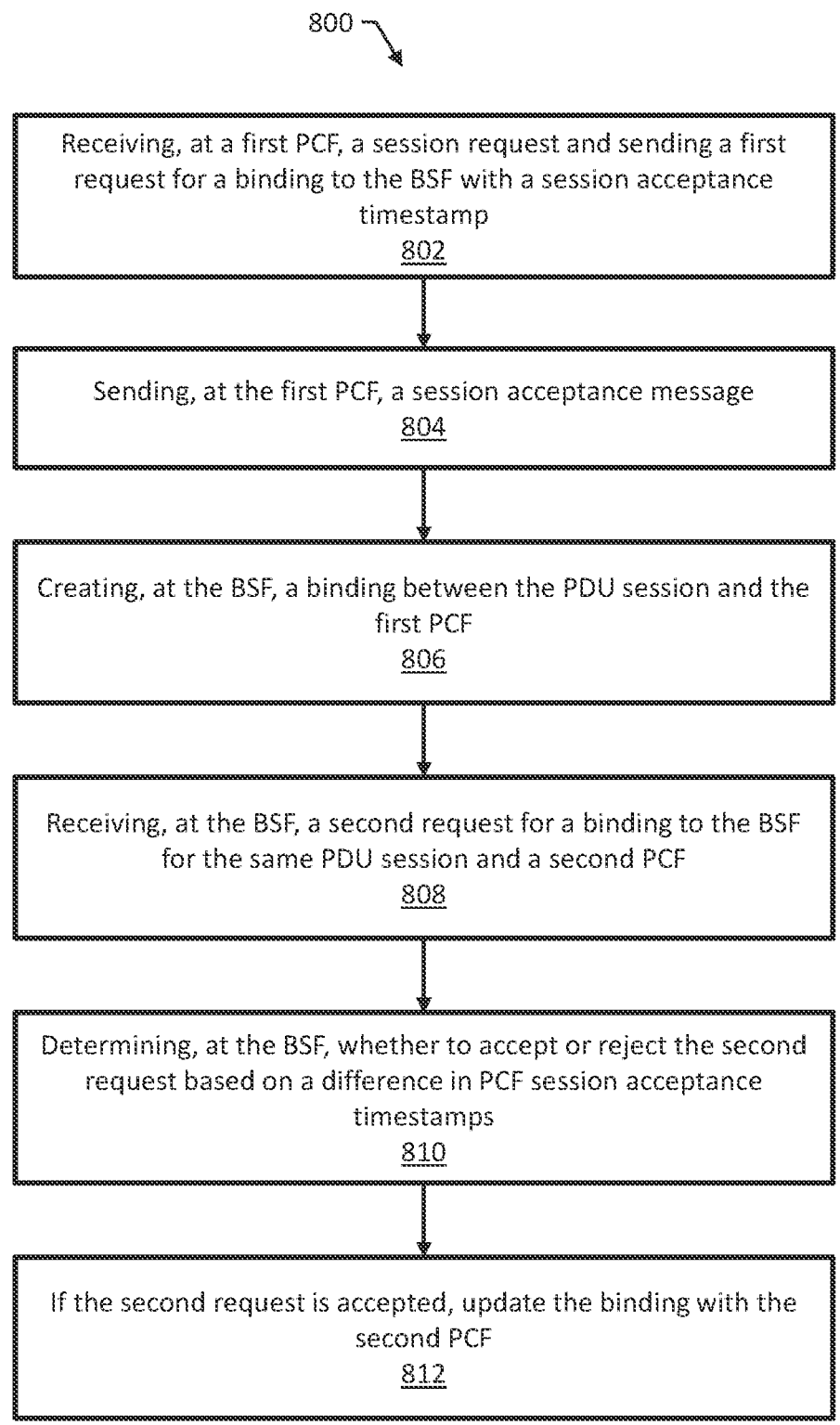
FIG. 8 is a flow diagram of an example method for processing binding requests in a telecommunications network.

FIG. 8 is a flow diagram of an example method 800 for processing binding requests in a telecommunications network.

Method 800 includes receiving, at a first PCF, a session request from an AMF, SMF, or SCP and creating a PDU session based on the session request (802). The session request can include one or more of: a 3gpp-Sbi-Origination-Timestamp, a 3gpp-Sbi-Sender-Timestamp, and a 3gpp-Sbi-Max-Rsp-Time header. These time stamps may not, however, be suitable for resolving conflicts between binding requests at a BSF due to the possibility that an SCP or another network node may alter these timestamps.

Method 800 includes sending, at the first PCF and to the BSF, a first request to create a first binding between the PDU session and the first PCF. Method 800 includes adding, at the first PCF, a first PCF session acceptance timestamp to a header of the first request. The session acceptance timestamp indicates a time, for example, that the first PCF created the PDU session. Method 800 includes sending, at the first PCF, a session acceptance message to the AMF, SMF, or SCP that sent the session request (804).

Method 800 includes creating, at the BSF, the first binding between the PDU session and the first PCF and storing, with the first binding, the first PCF session acceptance timestamp from the header of the first request (806). Method 800 includes receiving, at the BSF, a second request to create a second binding between the PDU session and a second PCF (808). Method 800 includes determining, at the BSF, whether to accept or reject the second request based on a difference between a second PCF session acceptance timestamp from a second header of the second request (810).

In some cases, determining whether to accept or reject the second request comprises determining that the second PCF session acceptance timestamp is later than the first PCF session acceptance timestamp and, in response, accepting the second request. This may occur, for example, when the AMF, SMF, or SCP that sent the session request times out and sends a different session request to the second PCF. Accepting the second request comprises deleting the first binding and creating the second binding between the PDU session and the second PCF (812). In some cases, determining whether to accept or reject the second request comprises determining that the second PCF session acceptance timestamp is earlier than the first PCF session acceptance timestamp and, in response, rejecting the second request.

REFERENCES

The disclosure of each of the following references is incorporated herein by reference in its entirety.
1. 3$^{rd}$ Generation Partnership Project; Technical Specification Group Core Network and Terminals; 5G System; Network Function Repository Services; Stage 3 (Release 17) 3GPP TS 29.510 V17.3.0 (2021 September)
2. 3$^{rd}$ Generation Partnership Project; Technical Specification Group Core Network and Terminals; 5G System; Network Slice Selection Services; Stage 3 3GPP TS 29.531 V16.3.0 (2020 July)

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features.

In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for processing binding requests in a telecommunications network, the method comprising:
   receiving, at a binding support function (BSF), a first request to create a first binding between a protocol data unit (PDU) session and a first policy and control function (PCF);
   creating, at the BSF, the first binding between the PDU session and the first PCF and storing, with the first binding, a first PCF session acceptance timestamp from a first header of the first request;
   receiving, at the BSF, a second request to create a second binding between the PDU session and a second PCF; and
   determining, at the BSF, whether to accept or reject the second request based on a difference between the first PCF session acceptance timestamp and a second PCF session acceptance timestamp from a second header of the second request.

2. The method of claim 1, wherein determining whether to accept or reject the second request comprises determining that the second PCF session acceptance timestamp is later than the first PCF session acceptance timestamp and, in response, accepting the second request.

3. The method of claim 2, wherein accepting the second request comprises deleting the first binding and creating the second binding between the PDU session and the second PCF.

4. The method of claim 1, wherein determining whether to accept or reject the second request comprises determining that the second PCF session acceptance timestamp is earlier than the first PCF session acceptance timestamp and, in response, rejecting the second request.

5. The method of claim 1, comprising receiving, at the first PCF, a session request from an access and mobility management function (AMF), session management function (SMF), or service communication proxy (SCP) and creating the PDU session.

6. The method of claim 5, comprising sending, at the first PCF, the first request and adding the first PCF session acceptance timestamp to the first header of the first request.

7. The method of claim 6, wherein sending the first request comprises sending the first request to the BSF by way of at least one SCP such that the SCP does not alter the first header of the first request.

8. The method of claim 5, comprising sending, at the first PCF, a session acceptance message to the AMF, SMF, or SCP that sent the session request.

9. The method of claim 5, wherein the session request includes one or more of: a 3gpp-Sbi-Origination-Timestamp, a 3gpp-Sbi-Sender-Timestamp, and a 3gpp-Sbi-Max-Rsp-Time header.

10. The method of claim 5, wherein the AMF, SMF, or SCP that sent the session request times out and sends a different session request to the second PCF.

11. A system for processing binding requests in a telecommunications network, the system comprising:
    at least one processor and memory storing instructions for the at least one processor;
    a binding support function (BSF) implemented by the at least one processor and configured for:
        receiving a first request to create a first binding between a protocol data unit (PDU) session and a first policy and control function (PCF);
        creating the first binding between the PDU session and the first PCF and storing, with the first binding, a first PCF session acceptance timestamp from a first header of the first request;
        receiving a second request to create a second binding between the PDU session and a second PCF; and
        determining whether to accept or reject the second request based on a difference between the first PCF session acceptance timestamp and a second PCF session acceptance timestamp from a second header of the second request.

12. The system of claim 11, wherein determining whether to accept or reject the second request comprises determining that the second PCF session acceptance timestamp is later than the first PCF session acceptance timestamp and, in response, accepting the second request.

13. The system of claim 12, wherein accepting the second request comprises deleting the first binding and creating the second binding between the PDU session and the second PCF.

14. The system of claim 11, wherein determining whether to accept or reject the second request comprises determining that the second PCF session acceptance timestamp is earlier than the first PCF session acceptance timestamp and, in response, rejecting the second request.

15. The system of claim 11, comprising the first PCF, wherein the first PCF is configured for receiving a session request from an access and mobility management function (AMF), session management function (SMF), or service communication proxy (SCP) and creating the PDU session.

16. The system of claim 15, wherein the first PCF is configured for sending the first request and adding the first PCF session acceptance timestamp to the first header of the first request.

17. The system of claim 16, wherein sending the first request comprises sending the first request to the BSF by way of at least one SCP such that the SCP does not alter the first header of the first request.

18. The system of claim 15, wherein the first PCR is configured for sending a session acceptance message to the AMF, SMF, or SCP that sent the session request.

19. The system of claim 15, the session request includes one or more of: a 3gpp-Sbi-Origination-Timestamp, a 3gpp-Sbi-Sender-Timestamp, and a 3gpp-Sbi-Max-Rsp-Time header.

20. One or more non-transitory computer readable media having stored thereon executable instructions that when executed by at least one processor of a computer cause the computer to perform steps comprising:
    receiving, at a binding support function (BSF), a first request to create a first binding between a protocol data unit (PDU) session and a first policy and control function (PCF);
    creating, at the BSF, the first binding between the PDU session and the first PCF and storing, with the first binding, a first PCF session acceptance timestamp from a first header of the first request;
    receiving, at the BSF, a second request to create a second binding between the PDU session and a second PCF; and
    determining, at the BSF, whether to accept or reject the second request based on a difference between the first PCF session acceptance timestamp and a second PCF session acceptance timestamp from a second header of the second request.

* * * * *